United States Patent
Destouches

(10) Patent No.: US 8,686,316 B2
(45) Date of Patent: Apr. 1, 2014

(54) AUTOMATIC WELDING DEVICE OF THE MIG/MAG TYPE

(75) Inventor: Denis Destouches, Dampleux (FR)

(73) Assignee: Serimax, Mitry-Mory (FR)

( * ) Notice: Subject to any disclaimer, the term of this patent is extended or adjusted under 35 U.S.C. 154(b) by 1171 days.

(21) Appl. No.: 12/095,747

(22) PCT Filed: Dec. 7, 2006

(86) PCT No.: PCT/FR2006/002680
§ 371 (c)(1),
(2), (4) Date: Nov. 1, 2008

(87) PCT Pub. No.: WO2007/066013
PCT Pub. Date: Jun. 14, 2007

(65) Prior Publication Data
US 2009/0090702 A1      Apr. 9, 2009

(30) Foreign Application Priority Data
Dec. 7, 2005   (FR) ..................................... 05 12409

(51) Int. Cl.
*B23K 9/10*      (2006.01)
(52) U.S. Cl.
USPC ........................................................ 219/136
(58) Field of Classification Search
USPC .................. 219/136, 137.2, 125.12, 124.1
See application file for complete search history.

(56) References Cited

U.S. PATENT DOCUMENTS

| | | | | |
|---|---|---|---|---|
| 2,061,671 A | * | 11/1936 | Riemenschneider | 219/74 |
| 3,807,715 A | * | 4/1974 | Nelson et al. | 266/261 |
| 4,131,780 A | * | 12/1978 | Trabbold et al. | 219/70 |
| 4,368,375 A | * | 1/1983 | Merrick et al. | 219/125.12 |
| 5,571,431 A | * | 11/1996 | Lantieri et al. | 219/130.01 |
| 6,191,379 B1 | | 2/2001 | Offer et al. | |
| 6,410,876 B1 | * | 6/2002 | Rinaldi | 219/61 |
| 2001/0017292 A1 | * | 8/2001 | Belloni et al. | 219/125.11 |

FOREIGN PATENT DOCUMENTS

| | | |
|---|---|---|
| DE | 4436084 | 2/1996 |
| EP | 1077102 | 2/2001 |

* cited by examiner

Primary Examiner — Henry Yuen
Assistant Examiner — Ayub Maye
(74) Attorney, Agent, or Firm — Oblon, Spivak, McClelland, Maier & Neustadt, L.L.P.

(57) ABSTRACT

The present invention concerns an automatic welding device of MIG/MAG type consisting of at least one carriage holding at least one welding head comprising at least one torch (1) guiding a consumable electrode wire along a parting plane (P) between the pipes to be welded, which brings the current to the end of the electrode wire in order to generate an electric arc and ensure melting of the filler metal, The invention consists of the fact that the welding head therefore presents a welding torch (1) intended to be centered in relation to the parting plane (P) to ensure the penetration pass and also bears at least two other so-called tracking welding torches (2, 3), respectively positioned one after the other following the first so-called central welding torch (1) and offset respectively on both sides of the so-called central torch (1) in order to make lateral passes.

Application to the welding of metal pipes in order to form pipelines.

12 Claims, 1 Drawing Sheet

AUTOMATIC WELDING DEVICE OF THE MIG/MAG TYPE

The present invention concerns an MIG/MAG type device for automatic welding of tubular parts such as metal pipes, placed end-to-end concentrically in order to be welded to form pipeline type conduits for transport of gas, petroleum or water.

The automatic welding of pipes is conventionally done on narrow bevel by the MIG/MAG consumable electrode arc welding process and with one or more circular wires, typically of diameter less than or equal to 1.4 mm, as consumable electrodes constituting the filler metal, with equipment more or less automated and containing either 1 or 2 MIG/MAG welding torches.

Such automatic welding is mainly used on narrow bevel to guarantee rapid welding speeds with a correct quality of welding, which requires beveling of the ends of the pipes on the pipeline laying site. Consequently, that need to make the bevels on site generates high costs associated with the mobilization of expensive equipment (beveler, hydraulic power plant) and, as needed, operators and related maintenance personnel.

Although such automatic welding, despite everything, remains important for very thick conduits, for narrow pipes manual welding is very frequently more competitive (less expensive and more productive) than automatic welding.

In fact, for automatic welding to be feasible on narrow pipes, it is necessary at the same time:

to manage to weld as in manual welding on pipes pre-machined on wide bevel (so-called "API" bevels with 30° pitch), and to limit the number of rotation passages around the pipe to two.

In conventional automatic MIG/MAG welding, with cylindrical wire as consumable electrode, the following problems arise for API bevel welding on single torch mode.

First of all, low productivity is obtained, for three rotation passages around the pipe are necessary to carry out welding. Furthermore, the welding speed for the $2^{nd}$ and $3^{rd}$ passes is slow, for the bevel width is considerable, resulting in the need for wide oscillations, which is incompatible with a rapid welding speed.

In addition, there is a dependency for the operator/welder to center the welding torch correctly, which is more difficult on wide bevel than on narrow bevel.

U.S. Pat. No. 2,061,671 describes a seam welding apparatus in which a welding head containing a plurality of electrodes is placed. These electrodes are distributed in pairs, each pair of electrodes being housed in a welding torch chamber so as to converge on each other, that is, toward the welded joint. The welding head then contains a plurality of successive convergent pairs of electrodes, which can be positioned at progressive different heights in relation to the joint line; however, the welding pairs cannot be laterally offset from one another. Such a welding apparatus seems difficult to use on a narrow bevel for welding pipeline pipes owing to its size along with, notably, the convergence of the electrodes of each pair of electrodes.

Document DE 4,436,084 describes a fusion welding device for the assembly of parts with several welding torches that are at the same time on one part, the welding parameters being adjustable, so that a single melting bath is formed. Successive welding torches are, therefore, proposed. In particular, the use of three electrodes is proposed for the assembly of parts having a wide space between them, with two of the electrodes being placed behind each other in the direction of the joint, and the third being laterally offset and inclined between the first two, so as to be located between the first two in the direction of the joint. That positioning is, therefore, tied only to a problem of size of the torches in order to obtain the smallest possible space in the succession of torches.

None of these devices offers a solution for carrying out consumable electrode arc welding on narrow pipes with so-called API bevel.

Consequently, the present invention is intended to solve the problems mentioned above by proposing an MIG/MAG type automatic welding device with which it is possible to carry out consumable electrode arc welding on narrow pipes, the ends of which are pre-machined to form a so-called API bevel with 30° pitch and which offers better lateral melting as well as a simpler procedure.

For that purpose, the object of the invention is an automatic welding device of MIG/MAG type consisting of at least one carriage holding at least one welding head comprising at least one torch guiding a consumable electrode wire along a parting plane between the pipes to be welded, which brings the current to the end of the electrode wire in order to generate an electric arc and ensure melting of the filler metal, characterized in that the welding head, therefore, presents a welding torch intended to be centered in relation to the parting plane to ensure the penetration pass and also bears at least two other so-called tracking welding torches, respectively positioned one after the other following the first so-called central welding torch and offset respectively on both sides of the said central torch in order to make lateral passes.

The automatic welding device according to the invention thus advantageously makes it possible to perform the penetration pass with the so-called central welding torch, positioned centered relative to the parting plane, in the forward direction of the carriage, but offset from said central torch, that is, from the parting plane, making it possible to perform a first lateral pass, and with the second tracking torch following said first tracking torch in the forward direction of the carriage, but on the other side of the parting plan ensuring the second lateral pass.

The welding device according to the invention very advantageously presents a much simpler welding head.

According to a first embodiment of the invention, the tracking torches respectively extend in a plane parallel to the plane in which the said central torch extends, that is, the parting plane in use.

According to a second embodiment of the invention, the tracking torches are inclined from the plane in which the said central plane extends, that is, the parting plant in use, at angles of equal value, but opposite each other relative to said plane.

With a welding device according to the invention, it is no longer obligatory to impart an oscillation to the welding torches, since the configuration of said torches enables lateral passes to be made, while ensuring effective lateral melting, without necessitating any oscillating motion or then only with an oscillation of very weak amplitude. A device according to the invention is therefore obtained with better lateral melting and a simpler procedure at the welding head. Furthermore, a greater flexibility in welding speeds is obtained.

However, it may be of interest to maintain an oscillating motion of low amplitude of the first central torch and also to impart an oscillation of low amplitude to the said two tracking torches. This oscillation movement may be common or independent between the first torch and the other two.

The device according to the invention can advantageously be of the standard type consisting of different subassemblies, notably a first subassembly, such as a carriage bearing the welding head, relative to the positioning and/or movement of the electrode wire in relation to the parting plane, a second subassembly relative to the electric arc consisting of means of production and control of the electric arc and a third subassembly involving the filler metal feed, as well as a fourth subassembly making it possible to produce and control a protective gas atmosphere.

A second welding rotation passage may advantageously be carried out with a welding device of the invention in order to complete the welding. That second rotation, depending on the thickness of metal remaining to be deposited after the first rotation, may be made solely with the tracking torches or else with all three torches of the device.

Furthermore, the first so-called central torch very advantageously serves as reference for regulating MIG/MAG type automatic welding, while the two tracking torches are used also for adjustment.

Thus, the welding, as used, requires control throughout welding of the distance between torch and bevel root, at least for the central torch.

Thus, the device according to the invention contains at least the means of control and adjustment of the distance between the central torch and the bevel root. Control of that distance is ensured by measurement in real time of at least one electric parameter (intensity, voltage, impedance, etc.) of the central torch and real time adjustment of said electric parameters as a function of the pre-programmed instructions depending on the circumferential position around the ends of the pipes to be assembled, that adjustment being made by regulating said distance between torch and bevel root. This control can be based on the measurement of welding intensity. In fact, during welding (and with the MIG process), there is a direct tie between the end distance of welding torch and bevel root.

Thus, if the means of measurement of intensity indicate an increase of the latter, this indicates that the welding torch has drawn near the pipe and, if the intensity diminishes, that the torch is moving away. The welding torch-bevel root distance can, therefore, then be regulated to keep the intensity as close as possible to the pre-programmed instruction.

Thus, appropriate means are provided to regulate the distance between the central welding torch and bevel root, so that said central torch is best positioned in relation to the programmed instruction values.

According to one embodiment, it can be envisaged that these means of regulating distance between the central welding torch and the bevel root are means of regulating the height of the welding head and therefore of the three torches in relation to the pipes.

According to a preferred embodiment, it can be arranged for the device to contain means of control and adjustment of the welding torch-bevel root distance for each of the welding torches. Thus, control of that distance is ensured by means of real time measurement of the electric parameters (intensity, voltage, impedance, etc.) of each torch and real time adjustment of said electric parameters as a function of the different pre-programmed instructions dependent on the circumferential position around the ends of the pipes to be assembled, so that each torch can be best positioned in relation to the programmed values. Thus, the welding device contains appropriate means for regulating the distance between each torch and the bevel root, by making it possible to raise or descend it in relation to the bevel after comparison of a measured electric value and a programmed instruction value. That adjustment is in real time as a function of the circumferential position around the ends of the pipes to be assembled, and that value can, according to the programming, be an intensity, a voltage or an impedance.

Centering of the assembly or torches, rigidly secured on a same block but with a degree of freedom for oscillation, is ensured by real time measurement of the electric parameters (intensity, voltage, etc.) of the two tracking torches, and then after comparison between the values obtained for each of those two torches, by sending an automatic signal to the translation/centering module of the welding head and, therefore, of the three torches, in order to obtain the same values on each of the two torches.

An automatic joint tracking is thereby carried out across the arc, and this joint tracking is simpler, more precise and more reliable than the joint tracking across the arc with a single torch oscillating on both sides of the bevel and for which it is necessary to synchronize the measurements of electric parameters with the oscillating motion.

Moreover, the welding device makes it possible to use an automatic welding process of MIG/MAG type on API bevel, as described above, whatever the position of the pipes (stationary pipes or pipes turning on positioners/turning gear, axis of pipes horizontal or inclined or vertical).

The welding device according to the invention makes possible the welding on API bevel for butting together steel pipes, whether of non-alloyed, slightly alloyed or strongly alloyed steel, in order to withstand corrosion, with chemical composition of the wire adapted to the application involved.

Preferable, the distance between the first torch and the two other tracking welding torches can be varied according to the application involved, by any appropriate means.

The invention will now be described more in detail with reference to the drawing in which.

Figure 1:
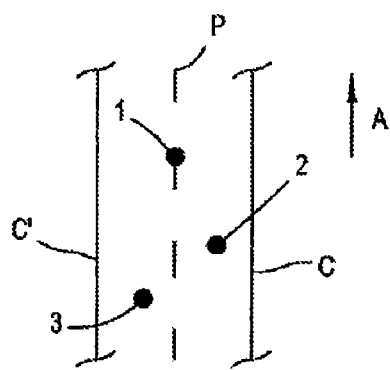
FIG. 1 represents in schematic top view the positioning of the welding torches of a device according to the invention.

The automatic welding device of MIG/MAG type according to the invention consists of at least one carriage holding a welding head containing three torches 1, 2, 3 respectively guiding a consumable electrode wire along a parting plane P between the pipes C, C' to be welded, which brings the current to the end of the electrode wire in order to generate an electric arc and ensure melting of the filler metal, as well as a gas for creating a protective atmosphere.

The welding torch 1 is centered in relation to the parting plane P in order to ensure the penetration pass, and the welding head also contains at least two other so-called tracking welding torches 2, 3. The so-called tracking welding torches 2, 3 are preferably borne on a same support. The electrode wire of the so-called central first torch 1 may be a flat wire, and the electrode wires of the other two torches 2, 3 may be cylindrical wires.

The second torch 2 is positioned after the so-called central welding torch 1 in the forward direction A of the carriage along the parting plane P, but offset from the parting plane P, and the tracking torch 3 is positioned after the tracking torch 2 on the other side of the parting plane P, also offset from the central torch 1.

Figure 2:
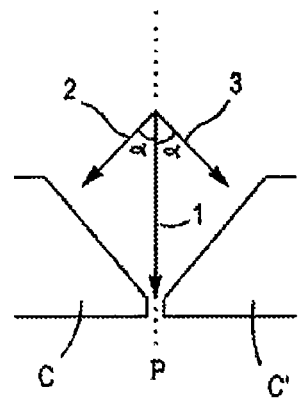
FIG. 2 represents a front view of a welding device according to the invention in position in an API bevel.
Figure 3:
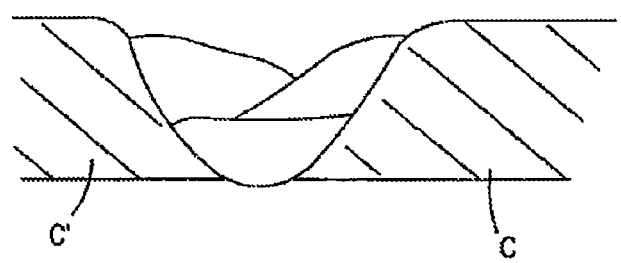
FIG. 3 represents a cutaway view of a bevel welded parallel after a first rotation of a device according to the invention.

As represented in FIG. 2, the tracking torches 2, 3 are inclined relative to the parting plane P at an identical angle $\alpha$, but opposite one another relative to the parting plane P.

The distance between the ends of the tracking torches 2, 3 can be adjusted along the axis of the pipes to be assembled as well as in the welding direction.

The three welding torches 1, 2, 3 can be rigidly secured in relation to the welding head, but they can have a degree of freedom enabling them to oscillate, oscillation being carried out at a low amplitude with appropriate oscillation drive means.

The invention claimed is:

1. An automatic welding device of MIG/MAG type consisting of:
   at least one carriage; and
   at least one welding head held by the at least one carriage, the welding head including at least one torch guiding a consumable electrode wire along a parting plane between pipes to be welded, which brings current to an end of the consumable electrode wire in order to generate an electric arc and ensure melting of a filler metal,
   wherein the at least one welding head includes:
      a central welding torch centered in relation to the parting plane to ensure a penetration pass of the central welding torch along the parting plane; and
      at least two other tracking welding torches, which includes a first tracking welding torch and a second tracking welding torch,
   wherein the first tracking welding torch is positioned on a first side of the parting plane and the second tracking welding torch is positioned on a second side of the parting plane opposite the first side, and
   wherein the first tracking welding torch is offset from the second tracking welding torch such that the first tracking welding torch follows the central welding torch and the second one of the tracking welding torch follows the first tracking welding torch with respect to a moving direction of the welding head, to provide sequential layers of partially overlapping lateral passes.

2. The device according to claim 1, wherein the tracking welding torches extend respectively in a plane parallel to the plane in which the central welding torch extends.

3. The device according to claim 1, wherein the tracking welding torches are inclined relative to the plane of the central welding torch at angles of equal value, but opposite each other relative to said plane.

4. The device according to claim 1, wherein a distance between ends of the tracking welding torches is adjustable along an axis of the pipes to be assembled as well as in the direction of welding.

5. The device according to claim 1, wherein the distance between the central welding torch and the two tracking welding torches is variable.

6. The device according to claim 1, wherein the central welding torch and the tracking welding torches are oscillating.

7. The device according to claim 1, wherein the device contains at least a means of control and adjustment of a distance between the central welding torch and a bevel root, said control of that distance being secured by real time measurement of at least one electric parameter selected from the group consisting of intensity, voltage, impedance of the torch, and real time adjustment of said electric parameter as a function of different preprogrammed instructions dependent on a circumferential position around the end of the pipes to be assembled by adjustment of the distance between the central welding torch and bevel root by appropriate means.

8. The device according to claim 1, wherein centering of the assembly or torches is secured by real time measurements of the electric parameters of the two tracking welding torches and then after comparison between the values obtained for each of those two tracking welding torches, by sending an automatic signal to a translation/centering module in order to obtain the same values on each of the two torches.

9. The device according to claim 1, wherein electrode wire of the central welding torch is a flat wire and electrode wires of the tracking welding torches are cylindrical wires.

10. The device according to claim 7, wherein the means of adjustment of the distance between the central welding torch and the bevel root are means of adjustment of height of the welding head and, therefore, of the three torches relative to the pipes.

11. The device according to claim 7, wherein the device contains means of control and adjustment of the welding torch-bevel root distance for each of the welding torches.

12. The device according to claim 6, wherein the central welding torch oscillates with a first oscillating motion, and the tracking welding torches oscillate with a second oscillating motion,
   wherein the first oscillating motion and the second oscillating motion are different from each other.

* * * * *